L. R. DUDLEY.
SHOCK ABSORBER.
APPLICATION FILED APR. 5, 1916.

1,304,950.

Patented May 27, 1919.
2 SHEETS—SHEET 1.

WITNESSES
Grace Paré
Léon Boillot

INVENTOR
LYLE R. DUDLEY,
per A. S. Paré
ATT'Y.

L. R. DUDLEY.
SHOCK ABSORBER.
APPLICATION FILED APR. 5, 1916.
1,304,950.
Patented May 27, 1919.
2 SHEETS—SHEET 2.
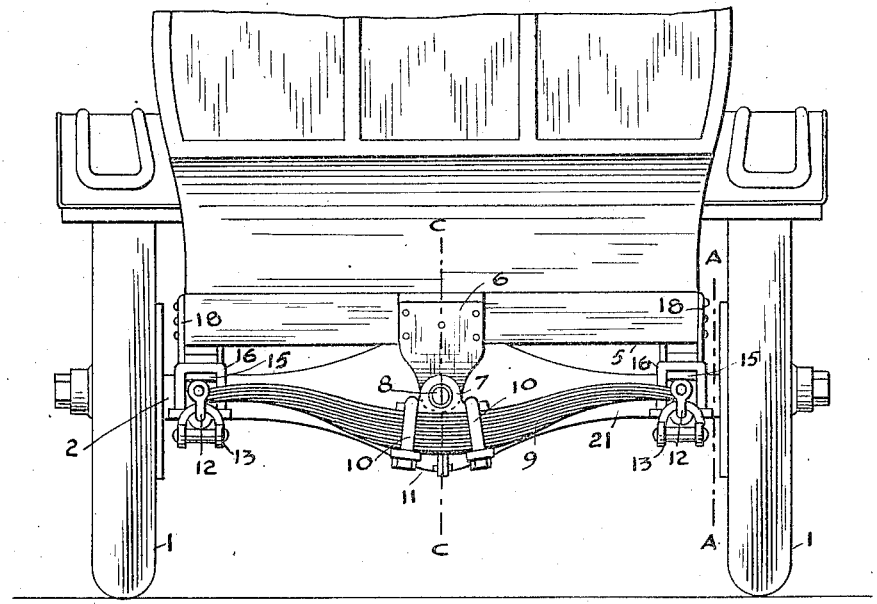
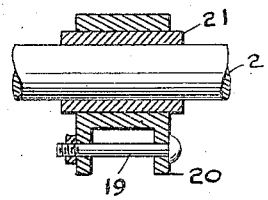
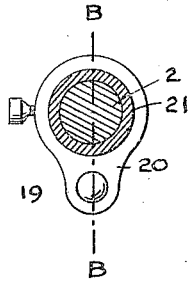
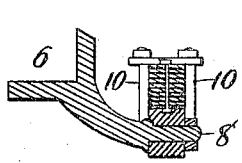
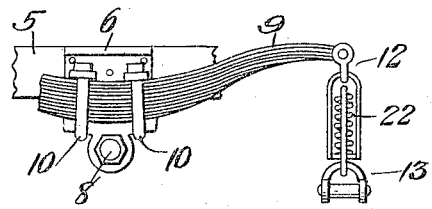
WITNESSES
INVENTOR
LYLE R. DUDLEY

UNITED STATES PATENT OFFICE.

LYLE R. DUDLEY, OF SAN FRANCISCO, CALIFORNIA.

SHOCK-ABSORBER.

1,304,950. Specification of Letters Patent. Patented May 27, 1919.

Application filed April 5, 1916. Serial No. 89,778.

*To all whom it may concern:*

Be it known that I, LYLE R. DUDLEY, residing in the city and county of San Francisco, State of California, have invented certain new and useful Improvements in Shock-Absorbers, whereof the following is a specification.

My invention relates to improvements in vehicle spring suspensions and more particularly to the manner of hanging the chassis frame of automobiles, with respect to the traction elements thereof.

Among the objects of this invention are to equalize the strain between the supported load and the traction wheels in such a manner:

That road shocks will be absorbed or minimized before reaching the load;

Traction will be improved and skidding minimized;

That the comfort of riding will be improved, the danger of spring breaking reduced to the minimum without sacrifice of rigidity and alinement of the driving mechanism;

That good riding qualities can be achieved without unduly lengthening the wheel base; and That the center of gravity may be lowered without sacrificing the clearance between the road and the axle.

Other objects and advantages will appear as the description progresses.

Designers are increasing the wheel base of automobiles in an endeavor to improve the riding qualities, particularly of pleasure automobiles, until now some of the cars are too long to negotiate short turns and curves encountered on mountain roads particularly. In the present invention a much shorter wheel base is possible, while retaining all the good qualities of a relatively longer wheel base, plus the other advantages of this invention, hereinafter set forth.

The safety feature alone justifies a low center of gravity. In the ordinary type of such vehicles as described, this is attained by what is known as "underslung" construction in which the chassis frame is suspended beneath the axles. The underslung construction, although attaining the object of lowering the center of gravity, does so at the sacrifice of road clearance between the axle and the road. The peculiar construction of this invention attains the low center of gravity without this sacrifice.

This invention attains better traction by more equally distributing the weight on the traction wheels. This also has many attendant advantages, such as a lesser tendency to skid, owing to a better distribution of weight and low center of gravity; improved braking power due to equalized traction, less strain upon tires, owing to the improved braking and equalized traction, etc.

In the accompanying two sheets of drawings I have illustrated my invention as embodied in what I consider its best form.

In the drawings:

Fig. 2 is a rear elevation of the same.

Fig. 3 is an enlarged detail in side elevation of the suspension stirrup engaging the axle housing, shown in cross section, adapted to support the front end of the side suspension spring.

Fig. 4 is a front elevation of the same, taken on the line B—B, Fig. 3.

Figure 1:
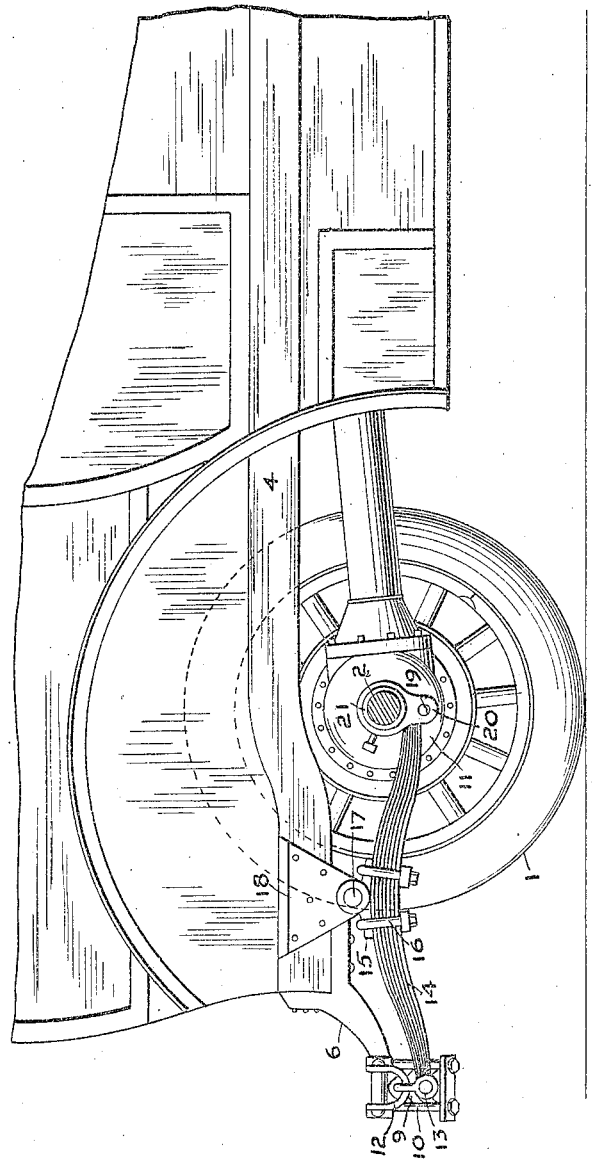
Figure 1 is a side elevation of an automobile chassis showing this invention applied thereto, the forward portion of the chassis and a portion of the body being broken away, as being non-essential to the disclosure of this invention; the rear wheel being removed on the line A—A, Fig. 2.

Fig. 5 is a side elevation in cross section on the line C—C, Fig. 2, of the supporting bracket for attaching the rear cross spring to the frame, the construction being modified by supporting the spring above the pivot instead of suspending it beneath, as illustrated in Fig. 2; and Fig. 6 is a fragmentary detail in side elevation, similarly modified in suspension, and illustrating a supplementary spring interposed between the ends of the side and rear spring, as a substitute for the usual shackle at this point.

In detail the construction illustrated in the drawing includes the traction wheels 1—1, mounted on the axle, 2, in the conventional manner. The chassis frame consists of the usual side beams, 4, joined at the end by the end beam, 5, in the usual manner. Intermediate the sides the supporting bracket, 6, is rigidly fixed to the end beam, 5. The spring saddle, 7, is pivoted on the stud, 8, of the bracket, 6. See Fig. 2. The half elliptic spring, 9, made up of superimposed leaves in the usual manner, is secured to the spring saddle by the clips, 10—10. This spring is preferably mounted on the stud, 8, in approximate alinement with the axis of the axle, 2, which brings the bottom of the spring somewhere near the lower level of the differential housing, 11, surrounding the axle; thus dropping the center of gravity as low as practicable.

The outer ends of the springs, 9, are provided with the shackles, 12—12, into which the shackles, 13—13, are hung. These shackles, 13, support the outer end of the side springs, 14, that are also preferably semi-elliptic, built up similar and supported like the spring, 9, by being attached to the saddles, 15, by the clips, 16. These saddles are pivoted on the studs, 17, extending outward from the brackets, 18, fixed to the side beams, 4, of the frame on opposite sides. The forward ends of the springs, 14, engage the bolts, 19, in the spring stirrups, 20, pivoted on the axle housing, 21, surrounding the axle 2.

The spring suspension above described conforms in a general way to what is known as platform springs; but in the present instance its mode of application and its operation on the vehicle are very different from the usual practice. In the present instance the side springs, 14, pivoted intermediate their ends greatly reduce the stroke of the spring, with respect to the descent of the body supported thereby, or the rise of the axle thereunder, as the case may be.

Ignoring the resiliency of the springs, the ratio of leverage is approximately 2 to 1, that is to say, if the wheel rides over an obstruction three inches high the displacement at the fulcrum, 17, would be about 1½ inches; the road shock of meeting such an obstruction at normal speed would therefore be reduced one half; the remaining one half would be absorbed by the resiliency of the springs. The ultimate effect therefore for all practical purposes is the total absorption of all normal road shock. In extraordinary instances the road shocks might be communicated to the passenger, but never to a disagreeable extent or sufficiently to endanger the vehicle, under such road conditions as are practical for such a vehicle.

The springs are cross equalized, as well as fore and aft, thereby bringing an equal strain on all springs simultaneously. Suppose for instance, a hole is encountered by the right rear wheel, the shock travels to the rear through the right side spring, 14, to the shackle, 12 and 13, across the rear of the machine through the cross spring, 9, through the shackle, 12—13, on the opposite ends, and forward into the left side spring; the circuitous travel of the strain relieving both the body and the driving mechanism from direct stresses, apt to result in serious disalinement or breakage.

If a shock is received simultaneously by both wheels, the compensation derived through the lever motion of the side springs, 14, reduces the shock movement which is absorbed by the resilience of the various interconnected springs.

The body will always remain substantially level, regardless of the rise and fall of these wheels, because of the cross equalization of the rear spring, 9, upon which the body is centrally pivoted. For illustration, if the rear right wheel climbs an obstruction 10 inches high, to give an extreme instance, the right side spring will teeter on its fulcrum, 17, lowering the rear end, taking the right hand end of the cross spring, 9, downward with it; the left hand end of the cross spring is thereby forced upward, taking the rear end of the left hand spring with it; as the left wheel is on the ground, the only movable point is the central pivot, 8, that will be forced upward, keeping the same level as the pivot, 17, forced upward by the rise of the wheel as described; there being an unequal number of pivotal centers, a rise at one side of the machine causes a proportionate rise on the opposite side of the machine due to the equalizing levers of the various interconnected spring levers.

Owing to the 2 to 1 leverage the body has risen only five inches, maintaining a substantial level during the rise; consequently this road inequality has been reduced one half, in its effect on the body of the vehicle, without taking into consideration the resiliency of the various springs in the suspension. In the case of the ordinary side suspension in common use, when one wheel goes into a hole all the body weight starts toward that low point and at average progressive speed of the vehicle, arrives just about the time the wheel is climbing out, bringing to bear the added power of the descending velocity of the load, resulting in a violent impact between the axle and the frame, followed by a rebound upward during which most spring breakages occur.

In the present construction such a condition could not occur. Assuming the vehicle to be traveling at ordinary speed, the action of these equalized springs will be so quick, and the reversal of the movement so complete, that the tendency of the body is to pull away from the low wheel, thereby relieving it of extra weight as it climbs out of the hole.

Another peculiarity of this construction owing to its longitudinal pivotal action centered on the axis, 8, is to cause the centrifugal force on rounding curves, to cause the body of the machine to "bank" rather than to pull outward from the top, as is common when the old form of spring suspension is used. This "banking" effect greatly reduces the danger of skidding, by equalizing the weight on both wheels, rather than to increase it on the outer wheel by lifting it from the inner one. The protection to tires and the vehicle in such a situation is sufficiently obvious.

The easy riding qualities of such a suspension, as disclosed in the description, make it unnecessary to unduly lengthen the wheel base with this object in view. With the rear wheels to which the power is applied well forward under the load, traction for hill climbing is materially increased, as a greater proportion of the load is transferred to these wheels, as the front end of the load is elevated, as in negotiating a gradient.

To increase the resiliency of the suspension, the auxiliary spiral springs, 22, see Fig. 6, may be interposed between the shackles, 12 and 13, to absorb the minor shocks before transmitting the major shocks to the shackles, giving soft riding on comparatively smooth roads, with the possibilities of greater tension if required.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States is the following, to wit:

1. A spring suspension for vehicles having a frame and an axle; a cross spring lever centrally pivoted on said frame; side spring levers pivoted on said frame intermediate their length and having one of their ends attached to the opposite ends of said cross spring lever, and their other ends attached to said axle.

2. A spring suspension for vehicles comprising a cross spring lever pivoted between the sides of the vehicle frame, and side spring levers pivoted to the sides of the vehicle frame intermediate their length, and having one of their ends attached to the ends of said cross spring lever, and their opposite ends attached to the axle of said vehicle.

3. A spring suspension for vehicles having a frame and an axle; a cross spring lever centrally pivoted on said frame; side spring levers pivoted on said frame intermediate their length, and having one of their ends attached to said axle, and resilient members connecting the ends of the cross spring lever to the adjacent ends of the side spring levers.

4. A spring suspension for vehicles having a frame and an axle; a cross spring lever pivoted on said frame intermediate the sides thereof behind said axle; side spring levers pivoted on said frame intermediate their length and having one of their ends attached to the opposite ends of said cross spring lever and their other ends attached to said axle.

5. A spring suspension for vehicles having a frame and an axle, a resilient cross lever centrally pivoted on said frame; resilient side levers pivoted on said frame intermediate their length and having one of their ends resiliently attached to the opposite ends of said cross lever, and their other ends pivotally attached to said axle.

6. A spring suspension for vehicles having a frame and an axle; a cross spring centrally mounted on said frame; side spring levers pivoted on said frame intermediate their length and having one of their ends attached to the opposite ends of said cross spring, and their other ends attached to said axle.

7. A spring suspension for vehicles having a frame and axle; a cross spring mounted on said frame; side springs pivoted on said frame having one of their ends pivotally secured to the opposite ends of said cross spring, and their other ends pivotally secured to said axle.

8. A spring suspension for vehicles having a frame and an axle; a cross spring pivotally mounted on said frame; side springs mounted on said frame having one of their ends secured to the opposite ends of said cross spring and their other ends secured to said axle.

9. In a vehicle, a frame and an axle provided with compensating resilient means consisting of a cross spring and side springs pivotally secured centrally to said frame and said side springs engaging said axle.

10. In a vehicle, a frame and an axle provided with compensating resilient means consisting of a cross spring and side springs pivotally mounted upon said frame and axle, the ends of said cross spring being pivotally secured to one end of said side springs.

11. In a vehicle, a frame and an axle provided with compensating resilient means consisting of a cross spring and side springs, said springs being centrally suspended to said frame and one end of said side springs suspended to said axle and the opposite ends to said cross spring.

12. In a vehicle, a frame and an axle provided with compensating resilient means consisting of a cross spring located at the rear end of the vehicle and pivotally suspended to said frame, side springs also pivotally suspended to said frame and axle, the ends of said cross spring being pivotally suspended to one end of said side springs.

In testimony that I claim the foregoing I have hereto set my hand in the presence of witnesses, this thirtieth day of March, 1916.

LYLE R. DUDLEY.

Witnesses:
E. C. DUDLEY,
CLARA A. SHREEDER.

Copies of this patent may be obtained for five cents each, by addressing the "Commissioner of Patents, Washington, D. C."